US010262338B2

(12) United States Patent
Krishnamurthy (10) Patent No.: US 10,262,338 B2
(45) Date of Patent: Apr. 16, 2019

(54) BIDDING FOR POSITION OF INSTALLED APPLICATION IN AN INTERFACE OF A MOBILE DEVICE

(71) Applicant: Facebook, Inc., Menlo Park, CA (US)

(72) Inventor: Rajiv Krishnamurthy, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 758 days.

(21) Appl. No.: 14/292,508

(22) Filed: May 30, 2014

(65) Prior Publication Data

US 2015/0348135 A1 Dec. 3, 2015

(51) Int. Cl.
G06F 3/048 (2013.01)
G06F 3/0482 (2013.01)
G06F 8/61 (2018.01)
G06Q 30/02 (2012.01)
H04L 29/08 (2006.01)

(52) U.S. Cl.
CPC ......... G06Q 30/0275 (2013.01); G06F 3/048 (2013.01); G06F 3/0482 (2013.01); G06F 8/61 (2013.01); H04L 67/20 (2013.01); H04L 67/34 (2013.01)

(58) Field of Classification Search
CPC .................................. G06Q 30/0207–30/0284
USPC ............................................. 705/14.1–14.73
See application file for complete search history.

(56) References Cited

U.S. PATENT DOCUMENTS

| 8,645,199 | B1* | 2/2014 | Sarkar | G06Q 30/0273 705/14.1 |
| 2011/0238496 | A1* | 9/2011 | Gurbuxani | G06Q 30/02 705/14.49 |
| 2012/0166532 | A1 | 6/2012 | Juan et al. | |
| 2012/0221404 | A1* | 8/2012 | Ahmed | G06Q 30/0261 705/14.39 |
| 2013/0198011 | A1* | 8/2013 | Corner | G06Q 30/06 705/14.71 |
| 2014/0019261 | A1* | 1/2014 | Hegeman | G06Q 30/02 705/14.71 |

(Continued)

OTHER PUBLICATIONS

Kandogan and Schneiderman; "Elastic Windows: Improved Spatial Layout and Rapid Multiple Window Operations", Technical report CS-TR-3522, University of Maryland, 1995 (Year: 1995).*

(Continued)

*Primary Examiner* — John Van Bramer
(74) *Attorney, Agent, or Firm* — Fenwick & West LLP (57) ABSTRACT

A client device or an online system determines a position in an interface presented by a client device for presenting content associated with an application installed on the client device based in part on a bid amount associated with the application. Scores are determined for the application and other applications installed on the client device based on an expected amount of user interaction with each application and bid amounts associated with one or more of the applications. Based on a score associated with an application, a position in the interface for presenting content associated with the application is determined. If the determined position satisfies a position specified by the bid amount and content associated with the application is presented in the determined position for at least a threshold amount of time, an online system charges a third party system associated with the application an amount.

19 Claims, 5 Drawing Sheets

(56) References Cited

U.S. PATENT DOCUMENTS

| | | |
|---|---|---|
| 2014/0156360 A1 | 6/2014 | Shalita et al. |
| 2014/0156566 A1 | 6/2014 | Kabiljo et al. |
| 2014/0156744 A1 | 6/2014 | Hua et al. |
| 2014/0164481 A1* | 6/2014 | Chia ................. H04L 67/22 709/203 |
| 2014/0180778 A1* | 6/2014 | Sengupta ............ G06F 9/445 705/14.6 |
| 2014/0358970 A1* | 12/2014 | Morris ............ G06F 17/30392 707/772 |
| 2015/0112791 A1* | 4/2015 | Jain ................. G06Q 30/0269 705/14.41 |
| 2016/0104209 A1* | 4/2016 | Rebierre ............. H04L 67/02 705/14.71 |

OTHER PUBLICATIONS

U.S. Appl. No. 14/049,429, filed Oct. 9, 2013, Inventors: Yu et al.

* cited by examiner

| Score 410 | | Rank 420 |
|---|---|---|
| 9.8 | Application 405A | 1 |
| 9.5 | Application 405B | 2 |
| 9.1 | Application 405C | 3 |
| 8.6 | Application 415 | 4 |
| 7 | Application 405D | 5 |
| 5.5 | Application 405E | 6 |
| 5.4 | Application 405F | 7 |
| 5.0 | Application 405G | 8 |
| 3.3 | Application 405H | 9 |

BIDDING FOR POSITION OF INSTALLED APPLICATION IN AN INTERFACE OF A MOBILE DEVICE

BACKGROUND

This invention relates generally to presenting content via a client device, and more specifically to determining a position in an interface of the client device for presenting content.

A content provider, such as an application developer, often generate revenue from user interaction with content provided by the content provider and presented via a client device. For example, an application developer receives revenue from user interactions with an application (e.g., purchased made via the application) provided by the application developer and installed on a client device. Additionally, an application developer may earn revenue from advertisers for advertisements presented to a user via an application associated with the application developer and executing on a client device (e.g., for each advertisement impression, for each user interaction with an advertisement, etc.).

Conventionally, content associated with an application, or with other content, is installed on a client device is presented in a position of an interface presented by the client device in based on the order in which the application or other content was installed relative to other applications or content installed on the client device. Because of this placement, a user may often navigate through a significant amount of content, such as information identifying other applications, to access a recently installed application or recently installed content. This navigation through other content may decrease the likelihood of a user accessing the recently installed application or recently installed content.

SUMMARY

A client device or an online system determines a position in an interface presented by a client device for presenting content associated with an application (or with other content) installed the client device that accounts for a bid amount associated with the application. A third party system, such as an application developer, identifies a position or a range of positions in the interface using the bid amount and specifies an amount of compensation provided by the third party system to the online system if content associated with the advertisement is presented in a position of the interface satisfying the position or range of positions specified by the bid amount. To determine the position in the interface for presenting content associated with the application, scores are determined for the application and for additional applications (or additional content) installed on the client device.

A score associated with an application is based on a bid amount associated with the application and an expected amount of interaction with the application by the user. The expected amount of interaction with an application is based on probabilities of the user performing different interactions with the application, which may be based on prior interactions by the user with one or more applications, and values associated with different interactions. If a user has performed less than a threshold amount of interaction with an application, prior interactions with applications having at least a threshold similarity to the application or prior interactions with the application by other users of the online system having at least a threshold similarity to the user may be used to determine the expected amount of interaction with the application. To determine a score for the application a conversion factor is applied to one or more of the bid amount associated with an application and the expected amount of interaction with the application, converting the bid amount and the expected amount of interaction into a common unit of measurement. The score associated with the application is generated by combining the expected amount of interaction and the bid amount after conversion to the common unit of measurement.

Scores are determined for an application as well as additional applications installed on the client device. Based on the scores associated with the application and the additional applications, a position in the interface for presenting content associated with the application, such as an icon, is determined. For example, the application and the additional applications are ranked based on their scores, with positions in the ranking mapped to positions in the interface. The mapping of positions in the ranking to positions in the interface may account for an expected amount of interaction with content presented in different positions in the interface, allowing the mapping to change over time based on changes in interactions. Hence, content associated with the application is presented in a position in the interface that is mapped to the application's position in the ranking. This allows the bid amount associated with the application to influence a position in the interface in which content associated with the application is presented to increase the likelihood of interaction with content associated with the application.

If content associated with application is presented in a position of the interface satisfying the position or range of positions specified by the application's bid amount for at least a threshold amount of time, the third party system associated with the application is charged an amount by the online system. Hence, if the user repositions content associated with the application in the interface to a position that does not satisfy the position or range of positions identified by the bid amount or uninstalls the application within the threshold period of time, the third party system is not charged. The amount charged to the third party system may be based on bid amounts associated with other applications installed on the client device as well as the bid amount associated with the application.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
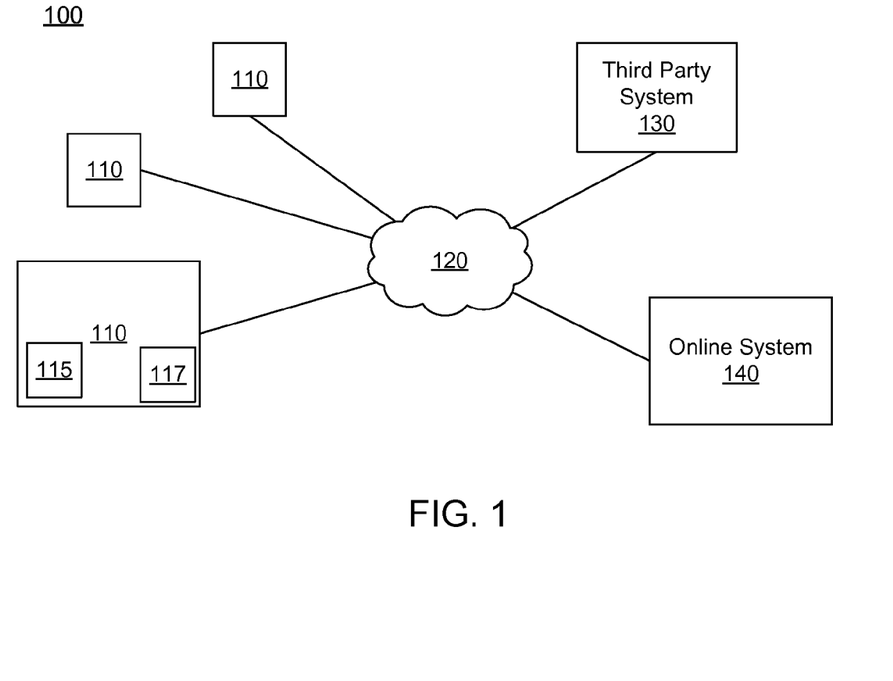
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. In some embodiments, the online system 140 is a social networking system.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

One or more applications may be installed on a client device 110 and provide a user of the client device with various functionality when executed by the client device 110. The client device 110 may display content associated with various applications in various positions of a user interface to allow a user to access different applications. For example, the client device 110 presents icons associated with different applications in different positions of an interface, and executes an application when the user interacts with a presented icon associated with the application. The client device 110 associates an identifier with various positions of the interface. In one embodiment, the client device 110 generates an interface including multiple screens, with each screen associating information from an application with different positions of the screen. A single screen of the interface is presented, with the presented screen modified based on a user interaction with the presented screen.

However, a likelihood or amount of user interaction with a position in the interface differs for different positions in the interface. For example, content associated with an application presented in a position proximate to a border or to a corner of the interface has a larger amount of user interaction or likelihood of user interaction than content associated with an application presented in a central position of the interface. When an application is installed on the client device 110, the client device 110 determines a position in the interface to associate with content from the application, such as an icon, based on a score associated with the application. The score is based on an expected amount of interaction by the user with the application and may also be based on a bid amount associated with installation of the application.

In some embodiments, the client device 110 includes a scoring module 115 that generates scores associated with applications installed on the client device 110 or applications requested to be installed on the client device 110 based on an expected amount of interaction with an application and a bid amount associated with the application. The bid amount associated with an application is received from a third party system 130, such as an application provider or an application developer, and specifies an amount of compensation the third party system 130 is willing to provide an online system 130 for presentation of content associated with the application in a specified position or specified positions of the interface presented by the client device 110. For example, the bid amount specifies an amount of compensation and one or more positions in the interface. In some embodiments, the bid amount specifies a specific position in the interface; however, in other embodiments, the bid amount may specify a range of positions in the interface. Bid amounts may be associated with an application requested to be installed to specify a position in the interface in which content associated with the application is presented when the application is installed. Alternatively, a bid amount may be associated with an application installed on the client device 110 and specify an amount of compensation to the online system 130 for presenting content associated with the application in a position, or within a range of positions, in the interface when other applications are installed on the client device.

The scoring module 115 also determines an expected amount of user interaction with an application, and determines a score associated with the application based on its associated bid amount and the expected amount of user interaction with the application. In one embodiment, the scoring module 115 determines an expected amount of user interaction based on probabilities of the user performing different interactions with the application and values associated with different interactions with the application. Examples of interactions with an application include making a purchase via the application, executing the application (e.g., a frequency with which the application is executed, a length of time the application is executed), repositioning content associated with the application in the interface (e.g., moving an icon associated with the application). For an application installed on the client device 110, the scoring module 115 determines an expected amount of interaction with the application based on prior interactions with the application over a specified time interval. For an application not yet installed on the client device 110 or for an application with which the user has interacted less than a threshold amount, prior interactions by the user with additional applications having at least a threshold measure of similarity with the application (e.g., additional applications having at least a threshold number or percentage of characteristics matching characteristics of the application). In some embodiments, interactions by additional users with an application with which the user has interacted less than the threshold amount is retrieved from the online system 140 and used to determine an expected amount of interaction by the user with the application. For example, additional users having at least a threshold number or percentage of characteristics matching characteristics of the user are identified by the online system 140 based on a request from the scoring module 115, and information describing interactions by the additional users with the application is communicated to the scoring module 115, subject to privacy settings associated with the interactions by each of the additional users.

To determine a score for an application, the scoring module 115 applies a conversion factor to one or more of the bid amount associated with an application and the expected amount of interaction with the application. The conversion factor converts the bid amount and the expected amount of interaction into a common unit of measurement. The score associated with the application is generated by combining the expected amount of interaction and the bid amount after application of the conversion factor. For example, the conversion factor is applied to the bid amount associated with an application, and the bid amount after application of the conversion factor is combined with the expected amount of interaction with the application to generate the score associated with the application. Alternatively, the conversion factor is applied to the expected amount of interaction with the application, and the expected amount of interaction after application of the conversion factor is combined with the bid amount. Generating a score by combining a bid amount with an expected amount of user interaction is further described in U.S. patent application Ser. No. 13/545,266, filed on Jul. 10, 2012, which is hereby incorporated by reference in its entirety.

In some embodiments, the scoring module 115 applies a position discount to a score associated with an application based on a position in the interface in which content associated with the application is presented. A position discount value reflects a predicted decrease in user interaction with content associated with an application based on a position in the interface in which the content is presented. In one example, the position discount is based on a location within the interface in which content associated with an application is presented relative to positions in the interface in which content associated with other applications is presented. Alternatively, the position discount is based on a position in which content associated with an application is presented relative to a reference position in the interface. For example, a user an increased likelihood of interacting with content presented in positions of the interface proximate to a corner or a boundary of the interface, so expected amounts of interaction with application presented in those positions are discounted less than expected amounts of interaction with applications associated with content presented in a center of the interface. The position discount value associated with a position may be based at least in part on a distance between the position and a reference position in the interface. Determining a position discount value associated with a position is further described in U.S. patent application Ser. No. 14/049,429, filed on Oct. 9, 2013, which is hereby incorporated by reference in its entirety.

In some embodiments, the scoring module 115 determines position discounts that are specific to different users of the social networking system 140. The scoring module 140 may determine position discounts based on in which different users of the social networking system 140 place content associated with applications, frequencies the users access applications having content located in different positions, or some combination thereof. Additionally, the scoring module 140 may develop user-specific position discount models and/or global position discount models. For example, the scoring module 115 determines in which positions a user associated with the client device 110 places content associated with various applications, determine how frequently the user associated with the client device 110 accesses content associated with applications in different positions, and determine a user-specific position discount model for the user associated with the client device 110 based on the user specific positioning and access information. Alternatively, the scoring module 115 may aggregate data associated with multiple users of the social networking system 140, such as data received from the social networking system 140, to generate a global position discount model based on interactions with application content associated with different positions. In some embodiments, the global position discount model may be modified (e.g., increased or decreased) based on the user-specific position model.

Based on scores associated with applications, the mapping module 117 determines a position in the interface in which content associated with one or more applications is presented. In one embodiment, the mapping module 117 ranks the applications based on their associated scores and determines a position in the interface for presenting content associated with an application based on the position of the application in the ranking. For example, the mapping module 117 maintains data mapping a position in a ranking to a position in the interface, such as a position identifier of a position in the interface associated with a position in the ranking. A position identifier of the position in the interface is retrieved based on an application's position in the ranking, and content associated with the application is presented in the interface at a position corresponding to the position identifier. Alternatively, the mapping module 117 associates position identifiers of positions in the interface with ranges of scores, and determines content associated with an application is presented in a position of the interface corresponding to a position identifier associated with a range of scores including the score associated with the application.

In various embodiments, the mapping module 117 accounts for user selection of positions in the interface in which one or more applications are presented when determining a position for displaying content associated with an application. If a user manually identifies a position of the interface for displaying content associated with an application, the mapping module 117 does not modify the application having content presented in the manually identified position. This allows a user to customize the interface based on personal preferences or usage patterns, and preserve the user customizations. For example, a position identifier associated with a position of the interface that a user has manually associated with an application is excluded from a ranking or is otherwise identified as being ineligible to be associated with a different application. When the user removes an association between the position and an application (e.g., by uninstalling the application, by associating the application with a different position in the interface), another application may be associated with the position by the mapping module 117. In some embodiments, manual repositioning of an application association to a different position may be used for computation of subsequent scores associated with applications for the same user or for users having at least a threshold measure of similarity to the user that repositioned the application (e.g., share at least a threshold number or percentage of characteristics matching characteristics of the user).

If an application is presented in a position of the interface specified by the application's bid amount or in a position of the interface within the application's bid amount, the mapping module 117 communicates to the online system 140 an instruction to charge a third party system 130 associated with the application. In some embodiments, the mapping module communicates the instruction to charge the third party system 130 if content associated with the application is presented in the position of the interface for at least a threshold period of time. Hence, if the user repositions content associated with the application in the interface or uninstalls the application within the threshold period of time, the third party system 130 is not charged by the online system. The amount charged to the third party system 130 may be based on bid amounts associated with other applications installed on the client device 110. Determination of a position in an interface for presenting content associated with an application is further described below in conjunction with FIGS. 3-4C.

While FIG. 1 shows an embodiment with the scoring module 115 and the mapping module 117 are included in a client device 110, in other embodiments, one or more of the scoring module 115 and the mapping module 117 are included in the online system 140. For example, the scoring module 115 and the mapping module 117 are included in the online system 140, as described below in conjunction with FIG. 2, and retrieve information describing user interaction and installed applications from the client device 110. In other embodiments, one of the scoring module 115 and the mapping module 117 is included in a client device 110 and the other is included in the online system 140.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
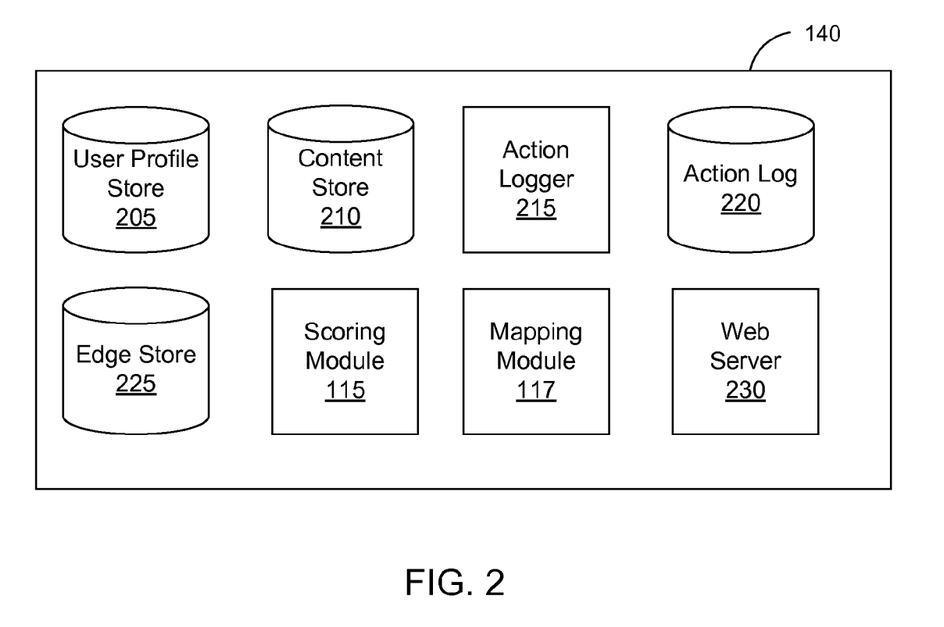
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, the scoring module 115, the mapping module 117, and a web server 230. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220.

Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest for an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

As described above in conjunction with FIG. 1, the scoring module 115 determines scores associated with various applications installed on a client device 110. In some embodiments, the scoring module 115 is included in the online system 140 and retrieves information identifying applications associated with a client device 110 (e.g., applications installed on the client device 110, applications to be installed on the client device 110) from the client device. The scoring module 115 determines bid amounts associated with the identified applications, as well as expected amounts of interactions with the identified applications and generates a score for each identified application as described above in conjunction with FIG. 1. In some embodiments, the scoring module 115 retrieves information describing user interaction with an application from the action log 220 or the edge store 225 and determines an expected amount of user interaction associated with the application from the retrieved information. Alternatively, the scoring module 115 receives information describing prior user interaction with an application from the client device 110, and determines an expected amount of user interaction from the received information. Additionally, when included in the online system 140, the scoring module 115 may retrieve bid amounts associated with applications from third party systems 130 associated with the application or from data associated with the applications and stored by the client device 110.

The mapping module 117, which is further described above in conjunction with FIG. 1, determines a position in an interface associated with an application based on a score associated with the application. If the mapping module 117 is included in the online system 140, information identifying a position associated with an application is communicated from the online system 140 to the client device 110, allowing the client device to present content associated with the application in the identified position. In some embodiments, the online system 140 communicates information to the client device 110 identifying positions in the interface generated by the client device associated with multiple applications. The mapping module 117, when included in the online system 140, receives an instruction to charge a third party system 130 associated with an application from the client device 110 when the client device 110 presents the application in a position of the interface specified by a bid amount associated with the application. After receiving the instruction from the client device, the mapping module 117 requests compensation from the third party system 130.

The web server 230 links the online system 140 via the network 120 to the one or more client devices 110, as well as to the one or more third party systems 130. The web server 230 serves web pages, as well as other content, such as JAVA®, FLASH®, XML and so forth. The web server 230 may receive and route messages between the online system 140 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the content store 210. Additionally, the web server 230 may provide application programming interface (API) functionality to send data directly to native client device operating systems, such as IOS®, ANDROID™, WEBOS® or BlackberryOS.

Determining Positions in an Interface Associated with an Application

Figure 3:
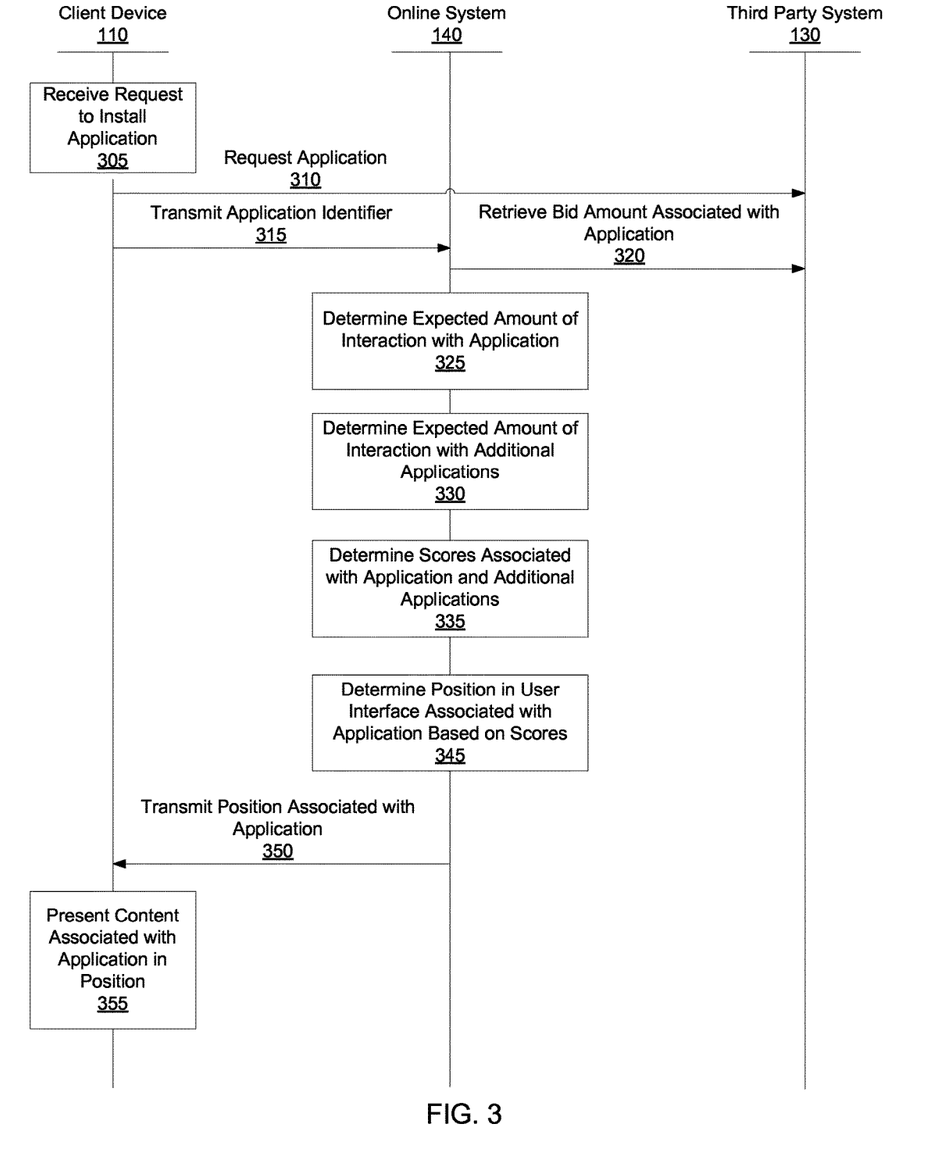
FIG. 3 is an interaction diagram of a method for determining a position in an interface associated with an application, in accordance with an embodiment.

FIG. 3 is an interaction diagram of one embodiment of a method for determining a position in an interface presented by a client device 110 for presenting content associated with an application. For purposes of illustration FIG. 3 depicts various steps are performed by an online system 140. However, in other embodiments, one or more of the steps depicted in FIG. 3 as performed by the online system 140 may be performed by the client device 110.

The client device 110 receives 305 a request to install an application from a user and requests 310 the application from a third party system 130 associated with the application. For example, the client device 110 requests 310 information for installing the application from the third party system 130. Additionally, the client device 110 transmits 315 an identifier of the application to the online system 140 along with information describing applications installed on the client device 110. In one embodiment, the information describing applications installed on the client device 110 identifies applications installed on the client device 110, positions in an interface presented by the client device 110 associated with applications, and positions in the interface that are not associated with an application. Information describing applications installed on the client device 110 also identifies positions in the interface that are unavailable for association with an application. For example, the information identifies positions in the interface with which a user manually associated an application.

Additionally, position discounts associated with various positions in the interface presented by the client device 110 may be transmitted 315 along with the identifier of the application. Alternatively, position discounts associated with various positions in the interface presented by the client device 110 are determined by the online system 140. As described above, a position discount associated with a position in the interface reflects a predicted decrease in user interaction with content associated with an application based on a position in the interface in which the content is presented. The online system 140, or the client device 110, may determine position discounts associated with positions in the interface based on prior interactions by a user of the client device 110 with content associated with applications presented in various positions. For example, user interactions with applications are retrieved from the action log 220, positions in the interface associated with the applications are identified and the user interactions are used to determine position discounts associated with positions in the interface.

In the example of FIG. 3, the online system 140 retrieves 320 a bid amount associated with the application from a third party system 130 associated with the application using the identifier associated with the application. The bid amount specifies an amount of compensation to the online system 140 by the third party system 130 and identifies one or more positions in the interface presented by the client device. For example, the bid amount identifies a specific position in the interface for which the online system 140 receives compensation if content associated with the application is presented in the specific position. As another example, the bid amount identifies a minimum position in the interface or a range of positions in the interface for which the online system 140 receives compensation if content associated with the application is presented with the specific position. In some embodiments, the bid amount is stored in association with an application identifier corresponding to the application, allowing the bid amount to be retrieved after the application is installed on the client device 110. However, some embodiments the bid amount may be communicated from the third party system 130 to the client device 110 in response to the third party system 130 receiving the request for the application. In these embodiments, the online system 140 retrieves 320 the bid amount associated with the application from the client device 110 or the client device 110 uses the bid amount as described below, The online system 140 determines 325 an expected amount of interaction by the user with the application and determines 330 an expected amount of interaction by the user with additional applications installed on the client device 110. In some embodiments, the online system 140 determines 325 the expected amount of interaction by the user with the application based on prior interactions by the user with one or more applications having at least a threshold measure of similarity to the application (e.g., applications having at least a threshold number or percentage of characteristics matching characteristics of the application) and/or prior interactions with the application by additional users of the online system 140 having at least a threshold measure of similarity with the user (e.g., additional users having at least a threshold number or percentage of characteristics matching characteristics of the user). As described above in conjunction with FIG. 1, an expected amount of interaction with the application is determined 325 based on types of interactions with the application previously performed by the user and values associated with different types of interactions with the application. Examples of interactions with an application include making a purchase via the application, executing the application (e.g., a frequency with which the application is executed, a length of time the application is executed), repositioning content associated with the application in the interface (e.g., moving an icon associated with the application). For example, probabilities of a user performing interactions are determined based on prior performances of the interactions by the user with the application (or with one or more applications having at least a threshold measure of similarity with the application), and an expected amount of interaction is determined based in part on values associated with the interactions and the determined probabilities. Expected amounts of interaction by the user with additional applications installed on the client device 110 are similarly determined 330 based on prior interactions by the user with each of the additional applications during a prior time interval.

Based in part on the expected amount of interaction with the application and the expected amounts of interaction with the additional applications, the online system 140 determines 335 scores associated with the application and with the additional applications. As described above in conjunction with FIG. 1, a score associated with an application (or with the additional application) is based on a bid amount associated with the application (or with the additional application) and an expected amount of interaction with the application (or with the additional application). A conversion factor is applied to one or more of the bid amount and the expected amount of interaction to convert the bid amount and the expected amount of interaction into a common unit of measurement, and a score is determined 340 by combining the bid amount and the expected amount of interaction when converted into the common unit of measurement. Hence, when determining 335 scores for the application and for the additional applications, the online system 140 retrieves the bid amount associated with the application and bid amounts associated with one or more of the additional applications. In some embodiments, if an application is not associated with a bid amount, a default bid amount is associated with the application when determining 335 the score; alternatively, a bid amount of zero is used when determining 335 scores for an application that is not associated with a bid amount. While FIG. 3 shows the online system 140 determining 335 the scores, in other embodiments, the client device 110 may determine 335 the scores.

The online system 140 determines 340 a position in an interface presented by the client device 110 for presenting content associated with the application based at least in part on the scores associated with the application and associated with the additional applications. In other embodiments, the client device 110 determines 340 the position in the interface for presenting content associated with the application based at least in part on the scores. For example, the application and the additional applications are ranked based on their associated scores. In one embodiment, higher positions in the ranking correspond to larger scores. Positions in the ranking are mapped to positions in the interface, so a position in the interface mapped to the application's position in the ranking is determined 340 as the position in the interface for presenting content associated with the application. The mapping of positions in the interface to positions in the ranking may be based on prior user interactions with content presented in various positions of the interface. In some embodiments, the mapping of positions in the interface to positions in the ranking is modified over time to account for changes in user interaction with content presented in various positions of the interface.

For example, position identifiers of positions in the interface are associated with positions in the ranking, and a position identifier associated with the application's position in the ranking is determined 340 to identify the position in the interface associated with the application. A position identifier of a position in the interface is retrieved based on an application's position in the ranking, and content associated with the application is presented in the interface at a position corresponding to the position identifier. When determining 340 the position in the interface associated with the application, positions in the interface with which the user has not manually associated with an additional application are identified, and scores associated with the additional applications and with the application are used to determine 340 a position associated with the application from the identified positions. This allows a user's manual association of positions in the interface with additional applications to be maintained when determining 340 the position associated with the application. Alternatively, position identifiers corresponding to positions in the interface are associated with different ranges of scores, and the online system 140 determines 340 a position in the interface associated with the application based on a position identifier associated with a range of scores including the score associated with the application.

The online system 140 transmits 350 the determined position associated with the application to the client device 110, which presents 355 content associated with the application in the determined position. For example, the client device 110 presents 355 an icon associated with the application in the determined position, allowing the user to execute the application by interacting with the icon. Additionally, the online system 140 may also transmit information identifying positions associated with one or more of the additional applications installed on the client device 110, allowing the client device 110 to modify positions in the interface used to present content associated with one or more additional applications. For example, when determining 345 the position associated with the application, positions associated with one or more additional applications may be altered, so information identifying the altered positions associated with one or more additional applications is transmitted to the client device 110 for updating positions in the interface presenting content associated with additional applications. In embodiments where the client device 110 determines 345 the position in the interface associated with the application, the client device presents 355 content associated with the application in the determined position.

If content associated with application is presented in a position of the interface specified by the application's bid amount or in a position of the interface within a range of positions specified by the application's bid amount for at least a threshold amount of time, the client device 110 communicates an instruction to the online system 140 an instruction to charge an amount to the third party system 130 associated with the application. Hence, if the user repositions content associated with the application in the interface or uninstalls the application within the threshold period of time, the third party system 130 is not charged by the online system. The amount charged to the third party system 130 may be based on bid amounts associated with other applications installed on the client device 110 as well as the bid amount associated with the application.

For purposes of illustration, FIG. 3 describes determination of a position of an application in an interface. However, in other embodiments, a position of any suitable content may be determined as described above. For example, the client device 110 may be a set top box or other device presenting content that determines positions in an interface for presenting information associated with various content (e.g., channels, shows, or other video data) based on an expected amount of user interaction with various content and bid amounts associated with various content as described above in conjunction with FIG. 3. In such an example, when content is provided to a client device 110 for presentation, positions in an interface of the client device 110 for presenting the content are determined as described above in conjunction with FIG. 3, allowing bid amounts associated with content to modify a position in an interface in which the content is presented by the client device 110.

Example Determination of a Position with an Application

Figure 4A:
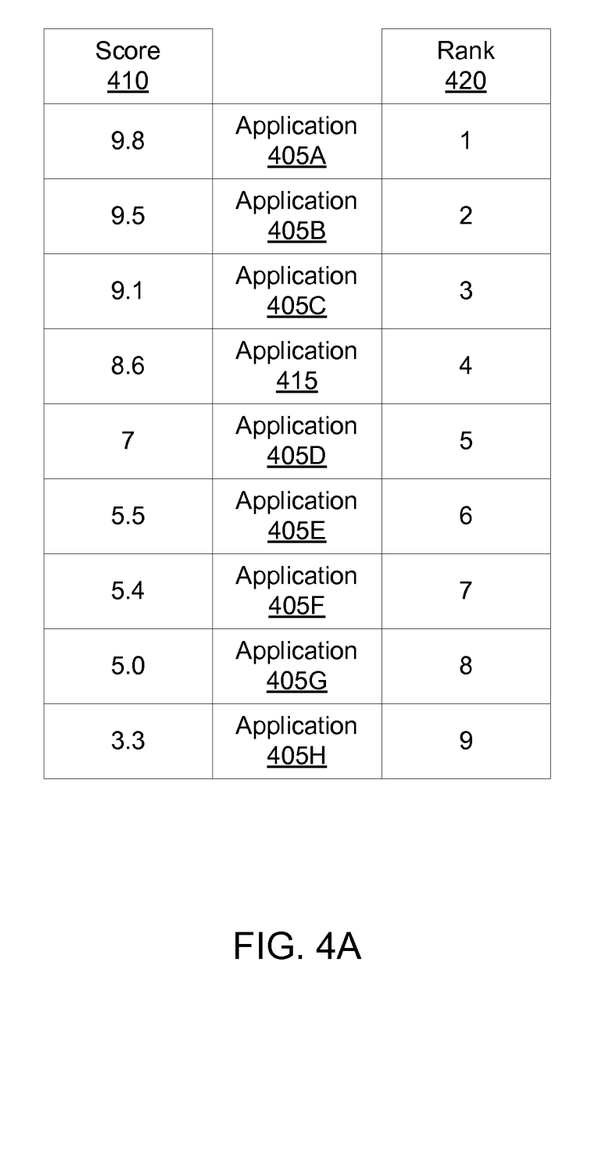
FIG. 4A is an example ranking of applications based on score associated with the applications, in accordance with an embodiment.
Figure 4B:
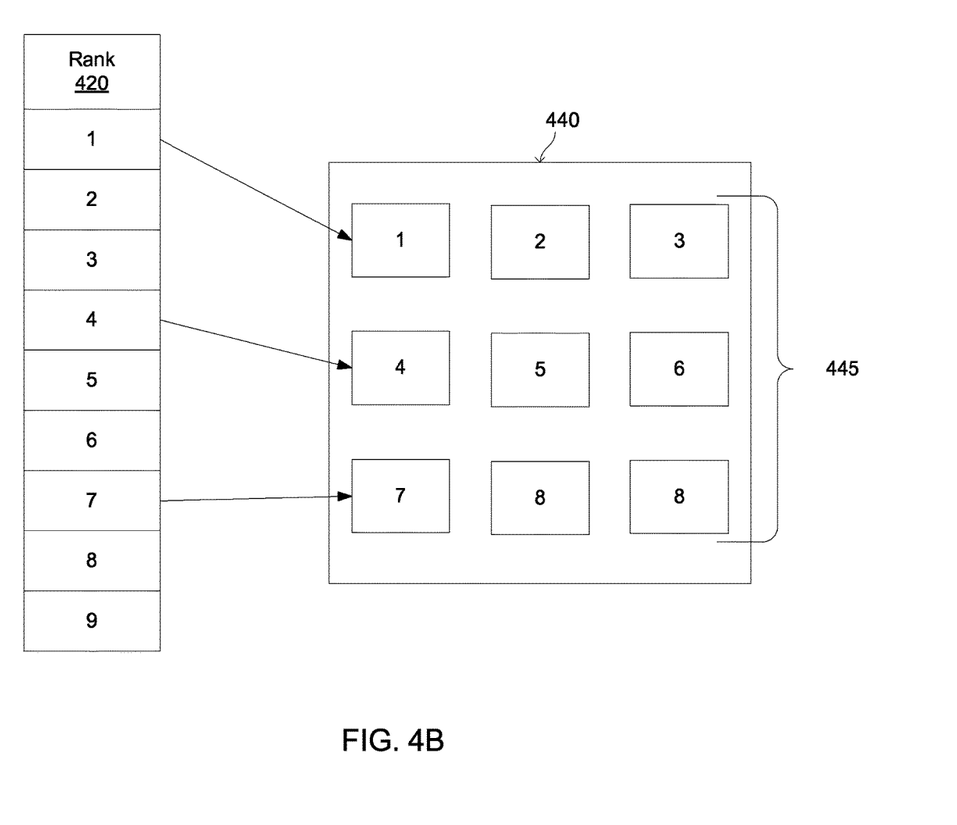
FIG. 4B is an example of a mapping of ranks in a ranking to positions in an interface displayed by a client device, in accordance with an embodiment.
Figure 4C:
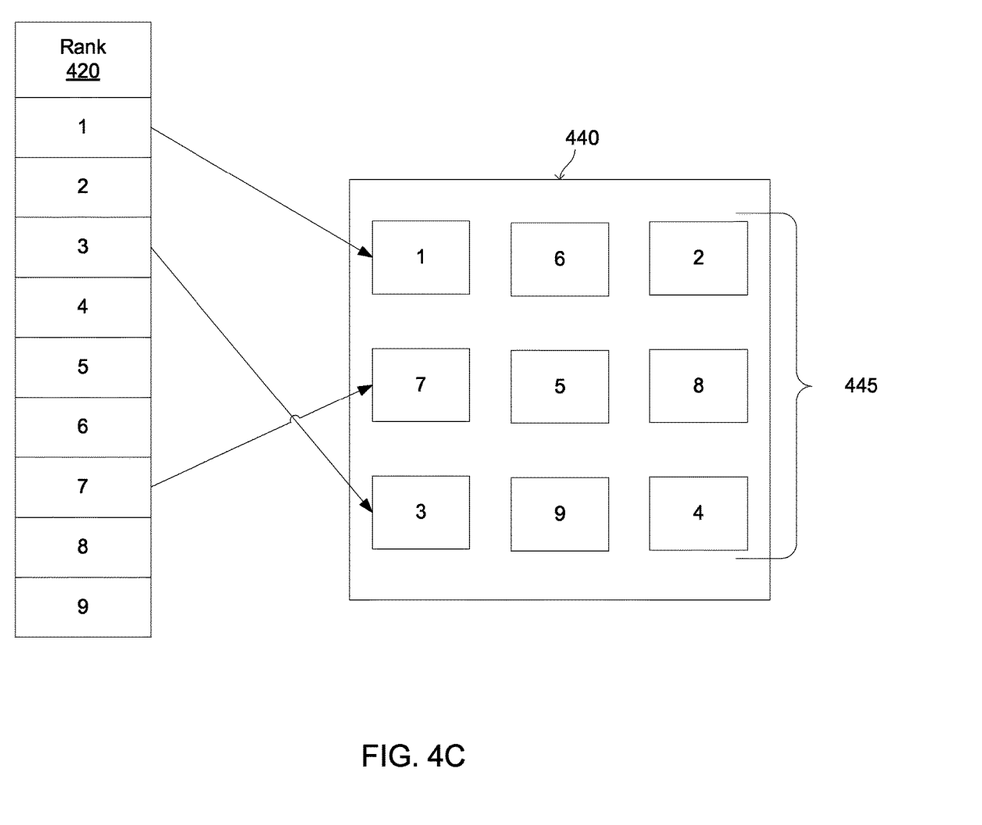
FIG. 4C is an example of an alternative mapping of ranks in a ranking to positions in an interface displayed by a client device, in accordance with an embodiment.

FIGS. 4A-4C are conceptual diagrams illustrating an example of determining a position in an interface presented by a client device 110 for presentation of content associated with an application. In FIG. 4A, applications 405A, 405B, 405C, 405D, 405E, 405F, 405G, 405H are previously installed on a client device 110, while application 415 has been requested to be installed on the client device 110. As shown in FIG. 4A, applications 405A-405H and application 415 are each associated with a score, which is determined as described above in conjunction with FIGS. 1 and 3. In the example of FIG. 4A, the applications 405A-405H and application 415 are ranked based on their associated score, with FIG. 4A showing a rank 420 associated with each of applications 405A-405H and 415 based on their associated score 410. FIG. 4A shows the application 415 requested to be installed as having a rank 420 of 4 based on its associated score 410 relative to scores 410 associated with applications 405A-405H.

FIG. 4B shows an example mapping of ranks to positions 445 in an interface 440 presented by a client device 110. In the example of FIG. 4B, ranks 420 are associated with positions 445 based on the spatial locations of positions in the interface 440. For example, content associated with an application having a rank of 1 is presented in the position 445 denoted with a "1" in FIG. 4B, while an application having a rank of 9 is presented in the position 445 denoted with a "9" in FIG. 4B. While FIG. 4B shows a single screen of the interface 440, positions 445 in additional screens of the interface 440 may also be mapped to ranks 420 in the ranking.

FIG. 4C shows an alternative mapping of ranks 420 to positions 445 in the interface 440. In the example of FIG. 4B, ranks 420 are mapped to positions 445 based on the expected amount of interaction by a user of the client device 110 with content presented in various positions 445. Referring to the example ranking of FIG. 4A, using the mapping shown by FIG. 4C, content associated with application 405A, which has a rank 420 of 1, is presented in the position 445 identified with a "1" in FIG. 4C, while content associated with application 415, which has a rank 420 of 4, is presented in the position 445 identified by a "4" in the interface 440. If ranks 420 are mapped to positions 445 in the interface 440 based expected user interaction with content presented in various positions 445, the mapping may be modified over time to account for changes in user interaction with content presented 445 in different positions. While FIG. 4C shows a single screen of the interface 440, positions 445 in additional screens of the interface 440 may also be mapped to ranks 420 in the ranking. Positions 445 in various screens of the interface 440 may be associated with various ranks 420. For example, positions 445 in a screen of the interface are associated with ranks 420 of 1 and 2, while positions 445 in an additional screen of the interface 440 are associated with ranks 3 and 4, so higher ranks 420 are associated with positions 445 of the interface associated with larger amounts of expected user interaction, regardless of the screen of the interface 440 including the positions 445.

Summary

The foregoing description of embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of embodiments is intended to be illustrative, but not limiting, of the scope of the patent rights, which is set forth in the following claims.

What is claimed is:

1. A computer-implemented method comprising:
receiving an application identifier from a client device associated with a user of an online system, the application identifier identifying a first application that is newly installed on the client device;
receiving, from the client device, information associated with one or more additional applications that were previously installed on the client device, the information identifying the one or more additional applications and describing positions at which icons identifying each of the one or more additional applications are presented in an interface of the client device and an amount of prior interaction by the user with each of one or more of the additional applications via the client device;
receiving a bid amount associated with the first application, the bid amount based in part on one or more positions in the interface of the client device that the first application can display an icon associated with the first application;
determining an expected amount of interaction with the first application by the user;

determining a score associated with the first application based at least in part on the bid amount associated with the first application and the expected amount of interaction with the first application by the user, the determining comprising:
applying, to at least one of the bid amount associated with the first application or the expected amount of interaction with the first application, a conversion factor that enables the bid amount and the expected amount of interaction to be converted into a common unit of measurement, the score associated with the first application also being associated with the common unit of measurement;
determining scores associated with the one or more additional applications previously installed on the client device using the received information, where a score associated with an additional application of the one or more additional applications is based at least in part on an expected amount of interaction with the additional application of the one or more additional applications by the user determined from prior interaction by the user with the additional application of the one or more additional applications via the client device;
determining a position in the interface for an icon identifying the first application and positions in the interface for the icons identifying the one or more additional applications by ranking the first application and the one or more additional applications based on the score associated with the first application and the scores associated with the one or more additional applications, the ranking excluding one or more positions in the interface with which the user manually associated with one or more icons identifying one or more additional applications, and mapping positions in the interface to positions in the interface; and
transmitting the position to the client device, the client device configured to present the icon associated with the first application in the determined position via the interface.

2. The method of claim 1, wherein determining the position in the interface, the position associated with the first application and is based at least in part on the score associated with the first application and the scores associated with the one or more additional applications, comprises:
ranking the first application and the one or more additional applications based at least in part on the score associated with the first application and the scores associated with the one or more additional applications; and
determining the position in the interface presented by the client device associated with the first application based at least in part on a position in the ranking.

3. The method of claim 2, wherein each position in the ranking is associated with a position in the interface.

4. The method of claim 1, wherein a score associated with an additional application is based at least in part on a bid amount associated with the additional application.

5. The method of claim 1, wherein the expected amount of interaction with the first application by the user is based at least in part on prior interactions by the user with one or more applications having at least a threshold measure of similarity with the first application.

6. The method of claim 1, wherein the expected amount of interaction with the first application by the user is based at least in part on prior interactions by additional users having at least a threshold measure of similarity with the user, the prior interactions by the additional users being retrieved from the online system.

7. The method of claim 1, wherein determining the position in the interface, the position associated with the first application and is based at least in part on the score associated with the first application and the scores associated with the one or more additional applications, comprises:
identifying positions in the interface presented by the client device with which the user has not manually associated an additional application; and
determining the position in the interface presented by the client device associated with the first application from the identified positions based at least in part on the score associated with the first application and the scores associated with the one or more additional applications.

8. The method of claim 1, wherein the bid amount associated with the first application specifies a requested position in the interface.

9. The method of claim 8, further comprising:
responsive to the determined position satisfying the requested position specified by the bid amount, transmitting an instruction to charge a third party associated with the first application an amount if content associated with the first application is presented in the determined position for at least a threshold amount of time.

10. A computer-implemented method comprising:
receiving an application identifier from a client device associated with a user of an online system, the application identifier identifying a first application that is newly installed on the client device;
receiving, from the client device, information identifying one or more additional applications that were previously installed on the client device, positions in an interface presented by the client device in which icons identifying each of the one or more additional applications are presented, and an amount of prior interaction by the user with each of one or more of the additional applications via the client device;
receiving a bid amount associated with the first application, the bid amount based in part on one or more of the positions in the interface of the client device that the first application can display an icon associated with the first application;
determining an expected amount of interaction with the first application by the user;
determining a score associated with the first application based at least in part on the bid amount associated with the first application and the expected amount of interaction with the first application by the user, the determining comprising:
applying, to at least one of the bid amount associated with the first application or the expected amount of interaction with the first application, a conversion factor that enables the bid amount and the expected amount of interaction to be converted into a common unit of measurement, the score associated with the first application also being associated with the common unit of measurement;
determining scores associated with the one or more additional applications previously installed on the client device using the received information, where a score associated with an additional application of the one or more additional applications is based at least in part on an expected amount of interaction with the additional application of the one or more applications by the user determined from prior interaction by the user with the additional application of the one or more additional applications via the client device;

determining a position in the interface for an icon identifying the first application and positions in the interface for the icons identifying the one or more additional applications by ranking the first application and the one or more additional applications based on the score associated with the first application and the scores associated with the one or more additional applications, the ranking excluding one or more positions in the interface with which the user manually associated with one or more icons identifying one or more additional applications, and mapping positions in the interface to positions in the interface; and transmitting the position to the client device, the client device configured to present the icon associated with the first application in the determined position via the interface.

11. The method of claim 10, wherein determining the position in the interface, the position associated with the first application and is based at least in part on the score associated with the first application and the scores associated with the one or more additional applications, comprises:

ranking the first application and the one or more additional applications based at least in part on the score associated with the first application and the scores associated with the one or more additional applications; and determining the position in the interface presented by the client device associated with the first application based at least in part on a position in the ranking.

12. The method of claim 11, wherein each position in the ranking is associated with a position in the interface.

13. The method of claim 10, wherein a score associated with an additional application is based at least in part on a bid amount associated with the additional application.

14. The method of claim 10, wherein the expected amount of interaction with the first application by the user is based at least in part on prior interactions by additional users having at least a threshold measure of similarity with the user, the prior interactions by the additional users being retrieved from the online system.

15. The method of claim 10, wherein determining the position in the interface, the position associated with the first application and is based at least in part on the score associated with the first application and the scores associated with the one or more additional applications, comprises:

identifying positions in the interface presented by the client device with which the user has not manually associated an additional application n; and determining the position in the interface presented by the client device associated with the first application from the identified positions based at least in part on the score associated with the first application and the scores associated with the one or more additional applications.

16. The method of claim 10, wherein the bid amount associated with the first application specifies a requested position in the interface.

17. The method of claim 16, further comprising:

receiving, from the client device, an instruction to charge a third party associated with the first application if the determined position satisfies the requested position specified by the bid amount and if the client device presents content associated with the first application in the determined position for at least a threshold amount of time.

18. A computer program product comprising a non-transitory computer readable storage medium having instructions encoded thereon that, when executed by a processor, cause the processor to:

receive an application identifier from a client device associated with a user of an online system, the application identifier identifying a first application that is newly installed on the client device;

receive, from the client device, information associated with one or more additional applications that were previously installed on the client device, the information identifying the one or more additional applications, describing positions at which icons identifying each of the one or more additional applications are presented in an interface of the client device, and an amount of prior interaction by the user with each of one or more of the additional applications via the client device;

receive a bid amount associated with the first application, the bid amount based in part on one or more positions in the interface of the client device that the first application can display an icon associated with the first application;

determine an expected amount of interaction with the first application by the user;

determine a score associated with the first application based at least in part on the bid amount associated with the first application and the expected amount of interaction with the first application by the user, the determining comprising:

apply, to at least one of the bid amount associated with the first application or the expected amount of interaction with the first application, a conversion factor that enables the bid amount and the expected amount of interaction to be converted into a common unit of measurement, the score associated with the first application also being associated with the common unit of measurement;

determine scores associated with the one or more additional applications previously installed on the client device using the received information, a score associated with an additional application of the one or more applications is based at least in part on an expected amount of interaction with the additional application of the one or more applications by the user determined from prior interaction by the user with the additional application of the one or more additional applications via the client device;

determine a position in the interface for an icon identifying the first application and positions in the interface for the icons identifying the one or more additional applications by ranking the first application and the one or more additional applications based on the score associated with the first application and the scores associated with the one or more additional applications, the ranking excluding one or more positions in the interface with which the user manually associated with one or more icons identifying one or more additional applications, and mapping positions in the interface to positions in the interface; and transmitting the position to the client device, the client device configured to present the icon associated with the first application in the determined position via the interface.

19. The computer program product of claim 18, wherein a score associated with the one or more additional applications is based at least in part on a bid amount associated with the one or more additional applications.

\* \* \* \* \*

UNITED STATES PATENT AND TRADEMARK OFFICE
CERTIFICATE OF CORRECTION

PATENT NO. : 10,262,338 B2
APPLICATION NO. : 14/292508
DATED : April 16, 2019
INVENTOR(S) : Rajiv Krishnamurthy It is certified that error appears in the above-identified patent and that said Letters Patent is hereby corrected as shown below:

In the Claims

Column 19, Claim 15, Line 51, delete "application n; and" and insert -- application; and --.

Signed and Sealed this
Seventeenth Day of September, 2019

Andrei Iancu
*Director of the United States Patent and Trademark Office*